United States Patent [19]
Friel et al.

[11] Patent Number: 5,472,537
[45] Date of Patent: Dec. 5, 1995

[54] END CAPPED FIBROUS FILTER MAKING

[75] Inventors: Raymond T. Friel, East Meadow; Colin F. Harwood, Glen Cove, both of N.Y.

[73] Assignee: Pall Corporation, East Hills, N.Y.

[21] Appl. No.: 426,472

[22] Filed: Apr. 20, 1995

Related U.S. Application Data

[63] Continuation of Ser. No. 252,047, May 31, 1994, abandoned, which is a continuation of Ser. No. 87,555, Jul. 8, 1993, abandoned, which is a continuation of Ser. No. 714,035, Jun. 12, 1991, abandoned.

[51] Int. Cl.$^6$ ................................................ B32B 31/00
[52] U.S. Cl. ...................... 156/69; 156/73.5; 156/308.2; 156/309.9; 156/322; 210/450; 210/496; 210/493.2; 210/497.01; 210/232
[58] Field of Search .................... 210/496, 493.2, 210/497.01, 232, 450; 156/69, 73.5, 808.2, 309.9, 322

[56] References Cited

U.S. PATENT DOCUMENTS

| | | |
|---|---|---|
| 3,457,339 | 7/1969 | Pall et al. |
| 3,899,378 | 8/1975 | Wragg et al. |
| 3,904,470 | 9/1975 | Fukuki et al. |
| 3,972,973 | 8/1976 | Yardley et al. .......................... 264/265 |
| 4,113,539 | 9/1978 | Hotta et al. |
| 4,442,004 | 4/1984 | Smith et al. |
| 4,678,577 | 7/1987 | Thomas et al. |
| 4,725,323 | 2/1988 | Ostreicher et al. |
| 4,726,901 | 2/1988 | Pall et al. ............................. 55/487 X |
| 4,731,184 | 3/1988 | Ostreicher et al. |
| 4,832,615 | 5/1989 | Thakrar et al. |
| 4,956,089 | 9/1990 | Hurst ................................... 156/218 X |
| 5,102,542 | 4/1992 | Lawrence et al. ............... 210/510.1 X |

FOREIGN PATENT DOCUMENTS

| | | |
|---|---|---|
| 1149467 | 9/1967 | United Kingdom . |
| 1199005 | 7/1970 | United Kingdom . |
| 2216090 | 10/1989 | United Kingdom . |

OTHER PUBLICATIONS

Monsanto Santoprene Thermoplastic Rubber Brochure, pp. 1–7.

*Primary Examiner*—Chester T. Barry
*Attorney, Agent, or Firm*—Leydig, Voit & Mayer

[57] ABSTRACT

Bonded end capped tubular or cylindrical filter elements are formed by fusing a fibrous mass of non-woven, intertwining, mechanically entangled, synthetic polymeric, microfibers possessing a temperature of dimensional heat instability and end caps formed from a dynamic vulcanizate comprising ethylene-propylene-diene-monomer (EPDM) rubber particles dispersed in a polypropylene matrix wherein the fused end capped filter exhibits minimal fiber pull back.

23 Claims, No Drawings

END CAPPED FIBROUS FILTER MAKING

This application is a continuation of Ser. No. 08/252,047 filed May 31, 1994 which is a continuation of Ser. No. 08/087,555 filed of Jul. 8, 1993 which is a continuation of Ser. No. 07/714,035 filed Jun. 12, 1991, all now abandoned.

TECHNICAL FIELD

This invention relates to end capped cylindrical, fibrous filters, methods of end capping such filters, and, more particularly, to directly bonded end capped tubular or cylindrical filter elements.

BACKGROUND ART

The use of fibrous filter cartridges, for example, in medical and industrial processes, is now commonplace. As conventionally used, high dirt capacity, fibrous filter cartridges are arranged to accept fluid flow either from the outside surface of the filter through the filter to the inside or from the inside to the outside of the filter. In the manufacture of tubular fibrous filter elements, end caps or end caps with gaskets are used to seal the open ends of the tube.

End capping is a well known method of sealing the end of a filter element to prevent bypass and to provide a fit into a housing. It is absolutely essential that the seal between the end cap and the filter be leakproof, since otherwise unfiltered fluid can bypass the filter at this point, contaminating the filtrate. One method for attaching end caps to tubular filter elements is applying an adhesive either to the ends of the tube or to the end caps, fitting the end caps to the tube, and maintaining pressure until a firm bond has been effected. Other methods of end capping involve bonding a plastic or metal cap onto the end of its filter with hot melt glues, epoxy resins, ultrasonics, fusion bonding, friction (spin) welding, etc.

End caps provide structural rigidity to the fibrous tube filter. Thus, it is ordinarily desirable that the seal between the end cap and the tube ends be tight.

When rigid, solid thermoplastic or metal end caps are applied to the filter element, it is often desirable to incorporate a deformable, solid elastomeric gasket to allow for slight differences in element lengths. In this way an effective seal is maintained between the filter cartridge and the housing. With tubular filters it is possible to construct an end cap incorporating a gasket which is bonded directly onto the filter. Such an end cap fills the dual function of sealing the end of the filter element and providing a resilient gasket to the housing. In order to achieve the dual function with a unitary end cap/gasket structure, one approach of the industry has been to turn to foamed polymers such as Volara® foam, a flexible closed cell radiation cross-linked polyethylene foam.

Foamed polymers provide for deformation and sealing. Foamed polymer end caps/gaskets, however, do not possess a high degree of strength in comparison to solid polymers. Also foamed polymer end caps often do not rebound after exposure to substantial temperature cycles, i.e., they possess low compression deflection.

As noted above, Volara® is a closed cell polyethylene foam and can readily be bonded to a filter element using, for example, a hot fusion technique; that is, heating the filter and bringing it in contact with the end cap to effect bonding. The technique has disadvantages in that the Volara® sets permanently and, therefore, the seal can be lost-if exposed to successive high and low temperature cycles.

A heat fusion technique can also be employed where the filter cartridge itself is heated and pressed into a foamed thermoplastic end cap. A first disadvantage with this technique is that directly heating the filter cartridge may impair the structural integrity and filtration capacity of the resulting capped filter. Polymeric microfibers generally exhibit fiber pull back upon direct application of heat to the filter. The fibrous mass shrinks due conformational heat instability of the component fibers. A second disadvantage relates to the physical characteristics of the foamed end caps themselves. The foamed end caps do not provide the structural strength or tear resistance of a solid rubber end cap. In industrial filter applications, foamed polymer end caps/gaskets may tear when subject to substantial forces, e.g., torque. If removed from a housing for checking or maintenance, foamed end caps are not likely to be reusable due to either tearing or permanent compressive deformation.

A high strength, tight seal is very difficult to achieve when a filter element is composed of a lofty, thermoplastic nonwoven microfibrous mass. Thermoplastic fibers, especially fibers composed of an amorphous, semi-crystalline, or crystalline thermoplastic possess both low heat conductivity and dimensional heat instability at elevated temperatures. In other words, a mass of interentangled fibers will have a tendency to shrink at elevated temperatures. In the case of amorphous or semi-crystalline fibers, surface tension forces drive a liquefied/softened material toward the geometry possessing the lowest surface energy, i.e., a sphere. Accordingly, when an amorphous fiber is exposed to eat energy sufficient to overcome the surface tension conformational energy, the fiber will tend to pull back and, in an extreme case, "roll up" into a sphere. In the case of more crystalline polymers, dimensional heat instability occurs at temperatures exceeding the crystalline transition temperature of the thermoplastic. Accordingly, in a filter cartridge composed of amorphous or crystalline thermoplastic fibers, heating the fibrous material to a temperature that induces shrinkage of the polymeric fibers results in pull back of the fibrous mass, both radially and, more importantly, axially, from the original dimensions of the filter cartridge. Thus, the structural integrity of the filter may be impaired and its filtering capability may be destroyed when the pull back is sufficient to allow bypass.

DISCLOSURE OF THE INVENTION

This invention provides a filter element composed of microfibers with an end cap/gasket integral to the filter where the end cap/gasket material is selected to have both physical characteristics desirable for end caps and a softening temperature compatible with the filter element microfibers. Preferably, the bonding portion of the end cap will soften/liquefy with application of heat energy insufficient to induce substantial fiber pull back in the filter element by localizing the heat energy to the zone of contact (bonding zone) between the filter element and the end cap.

Most preferred is a solid, resilient end cap composed of a material that is compatible with and fuses with the microfibers in the bonding zone. The end cap material also has a temperature of softening/liquefication which minimizes both the degree of filter element microfiber melting outside of the bonding zone and heat conduction to the non-contacting portions of the cold filter element. Since an insufficient amount of heat is transferred to the filter microfibers outside of the bonding zone, the heat energy imparted to those fibers does not exceed the conformational surface energy/crystalline transition temperature of the microfibers, thus avoiding substantial fiber pull back. Accordingly, the end cap bonds directly to the filter element without adversely affecting filter integrity.

Another aspect of this invention is that it can provide an end cap/gasket with elastomeric properties that will primarily bond with the filter element without bonding to a supporting filter core. Where the end cap is sufficiently resilient, it will resist penetration by the filter core. Since the cool filter core comprises an essentially solid mass, absent sufficient pressure and heat, there is insufficient energy to induce penetration of the resilient, softened end cap. Accordingly, small dimensional changes in the filter element during bonding will not cause the seal to be lost before the end cap/gasket seals the end on a tubular filter.

In accordance with the instant invention, a process and apparatus are provided for end capping tubular, such as cylindrical, depth filter elements while ensuring a leakproof and durable seal between the end cap and filter element without the drawbacks of the prior art.

The method of this invention provides a filter with an end cap which does not require additional material (e.g., glue) for bonding and provides a bond between the filter element and the end cap/gasket with minimum degradation of the components.

In accordance with the objectives of this invention, an end capped cylindrical fibrous filter element is provided preferably comprising a lofty, fibrous mass of non-woven-microfibers derived from a synthetic polymer possessing dimensional heat instability at elevated temperatures and end caps formed from a thermoplastic dynamic rubber vulcanizate. The fibrous mass embeds to a selected depth in the end cap. The fibrous mass in the bonding zone fuses with the end cap and fiber pull back of the fibrous mass due to fiber shrinkage (thermal conformational instability) is minimized. The invention therefore provides a unitary, integrated filter element.

This invention also provides a method for manufacturing end capped cylindrical fibrous filter elements formed from a lofty, fibrous mass of synthetic, polymeric microfibers. The synthetic polymer has a selected temperature of dimensional/conformational heat instability and the end cap/gasket is formed from a dynamic rubber vulcanizate. The method comprises the steps of generating sufficient heat in the end cap to soften or liquefy a selected portion thereof (the bonding zone) where the heat energy is sufficient for the end cap to induce bonding of the filter element microfibers present in the bonding zone, thus bonding the end cap to the filter element without causing melting or substantial dimensional instability of microfibers outside the bonding zone. The method contemplates contacting the fibrous element with the fibrous mass into the end cap to a desired depth. The contact induces penetration of the thermoplastic end cap vulcanizate into the fibrous mass. The degree of penetration is restricted to the selected depth substantially corresponding to the bonding zone. Thee end cap portion is then cooled to solidify the end cap material and to bond the portion of the fibrous mass in contact with the heated end cap portion in a manner to prevent fiber pull back of the fibrous mass and to establish a unitary integrated filter element.

An exemplary filter for use in this invention is the PROFILE® filter produced by Pall Corporation, Glen Cove, N.Y. The Pall PROFILE® filter is comprised of synthetic polymer, non-woven, microfibers to provide a depth filter with exceptional life in service. The exceptional life in service, i.e., high dirt capacity, results from the very large voids volume of a PROFILE® filter and its graded pore structure. The large voids volume provides room for an increased amount of dirt to collect before blockage occurs.

Due to the fiber structure and associated increase in voids volume of the PROFILE® filter, a need was recognized for a more effective seal at the end of the filter which maximized utilization of physical properties of the fibers. Housings for end capped PROFILE® elements generally utilize a knife edge seal between the filter core and end cap. Such knife edge seals are obtained only after relatively deep penetration (e.g., circa 0.165 inch) of the core into the end cap.

When the end cap is sufficiently deformable, the present invention dispenses with the need for a knife edge seal with the filter core. The present invention instead can rely on bonding between the end cap and the microfibrous filter mass. In the present invention, the microfibrous mass generally has a smaller heat capacity than the filter core. Thus, while the resiliency of the end cap resists penetration by a supporting filter element core during bonding, the microfibrous mass penetrates and bonds with the end cap. Tests indicate a very effective seal is developed without core bonding.

Furthermore, since this invention relies on bonding between the filter element and the end cap, there is minimum risk of developing filter bypass in retrofit housing PROFILE® filters. As the process is understood, retrofitting foamed end caps/gaskets to a filter housing often fails to provide the necessary seal as a result of substantially lower penetration, e.g., 0.03 inch, c.f., 0.165 inch core penetration. For retrofit applications, it is best to end cap the filter element in accordance with this invention.

The end cap of this invention is composed of a dynamic vulcanizate preferably comprising ethylene-propylene-diene-monomer (EPDM) rubber particles dispersed in a polypropylene matrix. Such thermoplastic/rubber vulcanizates, in normal use, do not compression set. They retain their rebounding capacity even following temperature cycling conditions. Thus, an end cap applied in accordance with this invention provides the requisite seal and prevents undesirable bypass. Moreover, such thermoplastic/rubber vulcanizates can be processed in an extruder, rolled, and then calendered to give a close tolerance thickness. End caps can then be stamped out into doughnut-shaped discs or discs of any other shape. Alternately, these vulcanizates can be injection molded into a suitable end cap/gasket shape. Injection molding permits direct incorporation of features, such as rounded edges, logos, part numbers, etc. Santoprene®, a product of Monsanto Company, provides an ideal end cap/gasket material for this invention.

The process of this invention involves bonding end caps to a microfibrous filter element. Such bonding may be effected by spin welding, i.e., by rotating the end cap relative to the filter element, and pressing the element against the end cap to generate localized frictional heat energy. This invention also contemplates heat plunging, i.e., plunging a cold microfibrous filter element into an end cap having a portion heated above the softening/liquefication temperature of the vulcanizate. The heat energy, temperature, and heat capacity of the end cap is controlled such that bonding of the fibers to the heated end cap in the bonding zone is achieved without inducing dimensional heat instability in the fibers and corresponding fiber pull back outside of the bonding zone.

In either process, generally the inside face of the end cap/gasket is softened/liquefied in the bonding zone. The heat is generated either from frictional contact or from an external heat source such as an infra-red heat plate. Preferably, the softened/liquefied portion of the end cap is from about 10 percent to about 90 percent depending on the thickness of the end cap. The preferred thickness is about 10–20 mils.

When a cool, fibrous filter element, such as a PROFILE® element, is pressed against the end cap, one of two processes occurs depending on the fiber composition. If the fibers possess a melting temperature such that the available thermal energy does not raise the fibers above their melting point, the softened/liquefied vulcanizate penetrates the fibrous network of the filter element in the bonding zone. If the thermal energy in the bonding zone is such that the melting temperature of the fibers is reached, then the fibers and end cap fuse by melt mixing. The resulting end cap and embedded filter element are then cooled to solidify and harden in the bonding zone. As a result, the edge(s) of one end of a filter material is embedded in the end cap. The procedure can be repeated for capping the other end of the filter element.

DESCRIPTION OF THE BEST MODE

Preferred Filter

In accordance with the practice of this invention, the filter is composed of lofty, intertwined and mechanically entangled, non-woven, synthetic, polymeric microfibers possessing a particular temperature of dimensional/conformational heat instability. The preferred filter element is described in U.S. Pat. No. 4,726,901 which is incorporated by reference herein and the pertinent aspects are now summarized.

The cylindrical fibrous structures comprise a fibrous mass of non-woven, synthetic, polymeric microfibers, the fibrous mass having a substantially constant voids volume over at least a substantial portion thereof as measured in the radial direction. The microfibers are substantially free of fiber-to-fiber bonding and are secured to each other by mechanical entanglement or intertwining. The filter structures are preferably supported by a hollow, open, relatively rigid, central support member or core with the fibrous mass of microfibers on the exterior of the support member. The fibrous mass preferably has a substantially constant voids volume and a graded fiber diameter structure over at least a portion thereof as measured in the radial direction which is obtained by progressively varying the fiber diameter as the cylindrical fibrous structure is built up while simultaneously holding the voids volume constant. This results in a graded pore structure and enhances the on-stream life of the filter.

The substantially constant voids volume, is typically in the range of from about 60 to about 95 percent, more preferably from about 64 to about 93 percent, and even more preferably from about 75 to about 85 percent. When amorphous polypropylene is used as the synthetic polymer, the most preferred voids volume is about 82 percent. Typically, the annular thickness of the cylindrical fibrous structures, particularly when used as depth filters, is in the range of from about 0.4 to about 1 inch (about 1.0 to about 2.5 cm), preferably in the range of about 0.5 to about 0.8 inch (about 1.3 to about 2.0 cm), and more preferably in the range of about 0.6 to about 0.7 inch (about 1.5 to about 1.8 cm). The cylindrical filter structures have high filter efficiency and enhanced dirt capacity or life. Polymeric materials for the fibers are amorphous, semi-crystalline, and crystalline thermoplastics such as the polyolefins, particularly polypropylene and polymethylpentene, polyamides, particularly nylon 6, nylon 610, nylon 10, nylon 11, nylon 12, polyesters, polybutylene terephthalate, polyethylene terephthalate, and addition polymers such as polyvinyl fluoride, polyvinylidene fluoride and their copolymers, and polycarbonates.

The fiber diameters can be varied from about 1.5 micrometers or less up to about 20 micrometers or more. However, when the product is made in the preferred voids volume range of about 75 to about 85 percent, fiber diameters above about 20 micrometers make elements so coarse as to have little use for filtration applications. Fiber aspect ratios are typically large, e.g., 1,000 or higher.

Various additives, such as activated carbon, ion exchange resins, and the like, can be incorporated into the cylindrical fibrous filter structures.

One filter configuration is made using a program for forming roll pressure, resin rate, fiberizing air rate, and cooling water flow which produces a constant density element with fibers varying in diameter from about 1.9 micrometer at the id (downstream) to about 12.6 micrometers at the od (upstream). Normally, fibrous filter cartridges in cylindrical form are employed, but it will be apparent that the process is applicable to tubular elements in any cross-sectional configuration, including plain, folded, corrugated, or the like. Furthermore, the invention is applicable to fiber filters manufactured by processes such as fiber lay-down, spiral wrapping, etc.

The following is an example of the effect of temperature on a filter element core. The effect of temperature on the dimensions of a polypropylene section when subjected to a temperature increase is found in the following table:

TABLE 1

| Temperature °C. (°F.) | Increase in Element Length (in Inches) | | | | |
|---|---|---|---|---|---|
| | 10 in. | 20 in. | 40 in. | Carbon Steel/ Profile | Stainless 304/Profile |
| 20 (36) | 0.04 | 0.08 | 0.16 | 0.038/0.002 | 0.036/0.004 |
| 40 (72) | 0.08 | 0.16 | 0.32 | 0.075/0.005 | 0.073/0.007 |

Preferred End Cap Composition and Structure

The composition of the end cap in accordance with this invention is a thermoplastic dynamic vulcanizate of ethylene-propylene-diene-monomer rubber particles in a polyethylene matrix. The primary requirements for the composition are that it must be compatible with the filter element, possess superior strength, possess structural integrity, possess both heat and compression dimensional stability, and be capable of softening with thermal energy at a temperature to prevent fiber dimensional/conformational heat instability outside of the bonding zone to minimize fiber pull back. End caps/gaskets for this invention generally possess a thickness of between about 0.03 to about 0.25 inch.

The compositions useful as the end cap/gasket material for this invention are rubber/thermoplastic compounds, more specifically thermoplastic, vulcanized polyolefinic/rubber compositions.

The preferred material is thermoplastic Santoprene® rubber. It is produced by dynamic vulcanization in which fully cured rubber particles (average size being one micron or less) are dispersed throughout a continuous matrix of thermoplastic material. The tensile properties of Santoprene® rubber include good tensile strength, ultimate elongation, 100 percent modulus, and hot and cold tear strength.

Santoprene® rubber is available in hardness grades ranging from 55 Shore A to 50 Shore D. Santoprene® rubber ranges from flexible to semi-rigid. It has a lower specific gravity than higher vulcanizates such as EPDM (ethylene-propylene-diene-monomer) so a lesser weight of Santoprene® rubber is required for the end caps. Santoprene® rubber has the environmental resistance equivalent to general purpose EPDM rubber compounds with fluid resistance comparable to general purpose polychloroprene/neoprene rubber compounds for aqueous-based fluids, oils, and hydrocarbons. Santoprene® rubber also retains its mechanical characteristics over a broad temperature range of from −40° F. to +300° F. (−40° C. to +150° C.).

Significant properties of Santoprene® for the purpose of this invention include its thermoplasticity, low compression and tension set, high tear strength, and good dynamic fatigue resistance. It is highly resistant to compression set after a constant deflection, particularly at elevated temperatures and for extended periods of time. Furthermore, Santoprene® rubber can be injection molded, extruded, blow molded, and calendered.

The preferred grade of Santoprene® for this invention is 271-64 which has a durometer of 64 Shore A and a softening liquefication temperature of 365° F.±20°. When the resin is processed, the durometer changes to approximately 70 Shore A. (ASTM Standard D2240-86).

Since the end caps are typically bonded to the filter element with a hand-tightened seal nut to apply the requisite loading, the load applied to the end cap is very low. While harder grades of Santoprene® may be used for some applications, they do not deform as easily when a seal is established. Consequently, 64 Shore A hardness is preferred but other grades ranging from 40 through 87 can be used.

Preferred End Cap Bonding Methods

The process of the invention for applying end caps to a fibrous filter formed in a substantially tubular shape comprises softening the end cap with heat generated either from frictional contact with the fibrous filter or from application of an external heat source. The heat energy softens or liquefies a selected portion (the bonding zone) of the end cap, generally the inside face of the end cap from about 10 to about 90 percent of the thickness of the end cap. As the fibrous filter tube is pressed against the end cap in the bonding zone, the softened rubber penetrates the fibrous network of the filter tube or melt mixes with the polymer fibers in the bonding zone. The end cap with the filter element embedded therein is then cooled to solidify and harden. As a result, one end of a filter element is embedded in and bonded to the previously softened end cap face and a leakproof seal is obtained The procedure can be repeated for capping the other end of the filter element.

Spin Welding

In the preferred bonding technique, referred to herein as spin welding, the heat required for bonding the end cap to the fibrous filter cartridge is supplied by careful frictional contact between a cold filter cartridge and a cold end cap. The end cap and filter cartridge are rotated relative to one another and pressed together with sufficient pressure to generate the requisite heat to soften the contact region of the end cap without significant degradation thereto. The fibrous filter cartridge penetrates the softened/liquefied contact region. Where the thermal energy is insufficient to induce fiber melting, the softened/liquefied vulcanizate permeates or flows between the fibers. Where the thermal energy exceeds the melting point of the fiber polymer, the thermoplastic end cap vulcanizate and filter element are melt mixed. Upon cooling, the composite material hardens, thus obtaining a unitary structure with an integral seal between the fibrous filter element and end cap.

Preferably, the end cap is rotated. The rotational rate must be adequate to induce softening of the vulcanizate when in contact with the filter. The rate determines the required time of contact of the filter element with the end cap. To control the insertion of the cartridge into the end cap, it is desirable to monitor the number of revolutions that the motor is allowed to spin during insertion. Caution must be exercised in the spin welding technique with the solid, rubber end cap. If too much pressure is applied, the mechanical force may tear or damage the filter element. If too little pressure is used, bonding will be incomplete and a complete seal will not be obtained.

EXAMPLE

Spin welding of Santoprene® grade 271-64 end caps/gaskets to a PROFILE® cartridge was carried out with a constant speed motor revolving at a rate of 500 to 4000 rpm, and preferably 1725 rpm. The motor was allowed to spin for approximately 28 revolutions to achieve maximum motor speed. A polypropylene PROFILE® filter element was brought into contact for about 1 second with a Santoprene® 271-64 gasket under pressure for 20–35 revolutions to raise the end cap temperature to 350°–400° F. to obtain a melt pool. An air cylinder was used to compress the PROFILE® filter to the end cap. During spin welding, the applied pressure should range from 20 to 100 psi, and preferably 50 to 90 psi, for a typical filter element (1.485 square inches for the 1⅜" bore). It is also preferred to regulate the pressure during the contact period as the filter element penetrates the end cap. If the original pressure is 90 psi, the pressure is preferably reduced to 60 psi by the end of the contact period. The invention, however, contemplates a broad range of pressure, rpm and time variables.

In contrast to a constant speed motor, if a variable speed motor is used, the number of revolutions can be fixed to achieve the bonding.

Heat Plunging

Another embodiment, referred to herein as heat plunging, involves heating an end cap followed by plunging a cold filter element into the liquefied/softened end cap and cooling the embedded filter element/end cap to obtain an integrated filter/end cap structure.

In summary, an end cap is placed in the recess of the end cap holder and the upper surface is exposed to an infra-red heater at a temperature of 800°–1520° F. for approximately 2 seconds to raise the end cap temperature to between 350°–400° F. until the surface softens/liquefies and the end cap can be thermally bonded to the filter element. When using a $CO_2$ blanket which facilitates heat transfer from the heater to the end cap, the heater temperature can range from 800°–1000° F. to obtain an end cap melt pool. When no heat transfer blanket is used, the required heater temperature generally ranges from 1300°–1520° F. At heater temperatures exceeding 1520° F. undesirable browning of the Santoprene® end cap is observed. A melt pool of Santoprene® at 350°–400° F. exhibits the consistency of viscous putty and is very sticky.

To provide for faster setting, the end cap holder may include means for continually circulating a coolant, thereby chilling the recess in which the end cap is positioned. Consequently, at least a portion of the thickness of the end cap is chilled to a temperature well below its softening point. The filter element, generally including a core coextensive therewith, is inserted into a filter element holder and is manually held in place therein. The filter is plunged and held under pressure against the end cap/gasket for 8–9 seconds. Ideally, this produces a melt depth of 0.010–0.020 inch of the filter element in the end cap. The resiliency of the vulcanizate, however, resists penetration by the core. Thus, bonding occurs only between the fibrous mass and end cap. The vulcanizate material (Santoprene®) permeates the voids of the fibrous filter material or melt mixes with the fibrous mass to obtain a leakproof seal.

After the softened portion of the end cap/gasket hardens, the capped filter element is removed from the end cap holder and the procedure is repeated for the other end of the filter element. As a result of this process, the end cap/gasket and filter element are bonded only in the bonding zone and, in essence, comprise an integral piece.

Industrial Applicability

The end capped cylindrical fibrous structures subject to the end capping process of this invention find use in a variety of filtration applications. The end capped fibrous filters of the subject invention provide a unitary structure with an integrated seal, minimizing adverse structural defects to the fibrous filter element. The solid, resilient end cap/gasket fibrous filter structures provide better efficiency and extended life than previously available end capped fibrous cylindrical depth filters and, especially, those employing foamed polymers.

End capped filters of this invention assure a tight, leak-proof seal and are thus well suited for the filtration of a wide variety of products to yield a liquid effluent free of contaminants.

Santoprene® has also been approved for use by the United States Food and Drug Administration for food and beverage as well as pharmaceutical applications. Therefore filters incorporating Santoprene® end caps can be used for food and drug processing.

In addition to their primary use as depth filters with high efficiency and extended life, the cylindrical fibrous structures of this invention may also find use as coalescers.

While the foregoing disclosure describes specified embodiments, other embodiments, modifications, and variations contained within the spirit of the following claims will be apparent to the skilled artisan.

We claim:

1. A method for manufacturing end capped, cylindrical, fibrous, filter elements formed from a lofty, fibrous mass of microfibers composed from a synthetic polymer having a selected temperature of dimensional/conformational heat instability and end caps formed from a dynamic rubber vulcanizate, the method comprising the steps of:

generating sufficient heat energy in the end cap to soften a selected portion thereof to induce bonding of the microfibers in the selected portion between the end cap to the fibrous mass of microfibers and filter element but insufficient to melt or cause substantial dimensional instability in the microfibers outside of the bonding zone;

contacting the fibrous element with the end cap in a manner to fuse the end cap and the fibrous mass to a selected depth substantially in the selected portion; and cooling the selected portion to solidify the end cap material and to bond the portion of the fibrous mass in contact therewith in a manner to prevent fiber pull back of said fibrous mass and to establish a unitary, integrated filter element.

2. The method according to claim 1 where the fibrous mass has a substantially constant voids volume and a varying fiber diameter to achieve a graded pore structure and the dynamic vulcanizate is ethylene-propylene-diene-monomer (EPDM) rubber particles dispersed in a polypropylene matrix, and further comprising the steps of rotating the end cap and cylindrical fibrous structure relative to each other and pressing the fibrous mass into the end cap under pressure for friction contact and heat generation to provide bonding of the filter element to the end cap upon cooling.

3. The method according to claim 2 wherein the fibrous mass is composed of amorphous polypropylene fibers and has a substantially constant voids volume and a varying fiber diameter to achieve a graded pore structure and the dynamic vulcanizate is ethylene-propylene-diene-monomer (EPDM) rubber particles dispersed in a polypropylene matrix, wherein the end cap is rotated and the cylindrical fibrous fiber structure is stationary and wherein the fibers and vulcanizate are fused.

4. The method according to claim 3 wherein the end cap is rotated at a rate of about 500 to about 4000 rpm.

5. The method according to claim 4 wherein the cylindrical filter structure is pressed into the end cap at an initial pressure of about 20 to about 100 psi.

6. The method according to claim 5 further including the step of regulating the application pressure where the pressure applied to the cylindrical filter structure diminishes during the period of contact with the end cap.

7. The method according to claim 6 wherein the pressure is diminished from about 90 to about 60 psi.

8. The method according to claim 1 wherein the dynamic vulcanizate is ethylene-propylene-diene-monomer (EPDM) rubber particles dispersed in a polypropylene matrix, and wherein the end cap vulcanizate is heated with an external heating source.

9. The method according to claim 8 wherein the end cap is heated to a temperature exceeding its softening point but below the end cap vulcanizate degradation temperature and wherein the temperature is insufficient to melt the fibers, the method further including the step of vulcanizate penetration into the fibrous mass in the selected portion.

10. A method according to claim 8 wherein the fibrous mass has a substantially constant voids volume and a varying fiber diameter to achieve a graded pore structure and wherein the end cap is heated to a temperature of from about 350° to about 450° F.

11. The method according to claim 8 wherein the fibrous mass has a substantially constant voids volume and a varying fiber diameter to achieve a graded pore size and wherein the end cap is heated to a temperature of from about 350° to about 450° F.

12. A method of end capping a fibrous filter cartridge comprising a mass of intertwined and mechanically entangled, non-woven, synthetic, polymeric microfibers possessing a particular temperature of dimensional heat instability and supported on a core to an end cap formed of a polypropylene rubber blend having a selected softening temperature, the method comprising the steps of rotating the end cap at a high rotational rate;

pressing the filter cartridge into the end cap at sufficient pressure and for a sufficient number of revolutions to induce frictional heating of the end cap portion in contact with the filter cartridge to generate heat energy sufficient to soften the end cap portion;

embedding the end of the filter cartridge in the heated end cap portion where the heat energy is insufficient to induce dimensional heat instability of the fibers outside of the embedded end but sufficient to fuse the mass of microfibers of the embedded end to the end cap where fiber pull back is prevented and the structural integrity of the filter cartridge is preserved; and cooling the end cap to provide an integrated, unitary end capped filter cartridge.

13. The method according to claim 12 wherein the filter cartridge has a substantially constant voids volume and a varying fiber diameter to achieve a graded pore structure and the polypropylene rubber blend is a dynamic vulcanizate composed of ethylene-propylene-diene-monomer (EPDM) rubber particles dispersed in a polypropylene matrix.

14. The method according to claim 13 wherein the end cap is rotated at a rate of about 1725 rpm and the filter cartridge is pressed into the end cap for about 20 to about 35 revolutions at an initial pressure of about 90 psi.

15. The method according to claim 13 wherein the rotational rate of the end cap varies for a predetermined number of revolutions sufficient to achieve fusing of the fibrous mass of the filter cartridge to the end cap.

16. A method for manufacturing a filter cartridge comprising:

providing a filter element having microfibers;

providing a filter end cap made from a dynamic vulcanizate; and embedding said microfibers into said end cap.

17. The method according to claim 16, wherein the embedding step includes generating sufficient heat energy in the end cap to soften a bonding zone thereof and to induce bonding of the microfibers present in the bonding zone but insufficient to melt or cause substantial dimensional instability in the microfibers outside of the bonding zone.

18. The method of claim 17, including the step of cooling the bonding zone to solidify the end cap material and to bond the portion of the microfibers in contact therewith in a manner to prevent fiber pull back of the microfibers and to establish a unitary, integrated filter element wherein the microfibers and vulcanizate are fused.

19. The method of claim 16, wherein the embedding step includes contacting the microfibers with the end cap in a manner to fuse the end cap and the microfibers to a selected depth.

20. The method of claim 16, wherein the filter element is formed from a fibrous mass of the microfibers and has a substantially constant voids volume and a varying fiber diameter to achieve a graded pore structure.

21. The method of claim 16, wherein the dynamic vulcanizate is ethylene-propylene-diene-monomer rubber particles dispersed in a polypropylene matrix.

22. The method of claim 16, further including the steps of rotating the end cap at a rate of about 500 to about 4000 rpm relative to the filter element, pressing the microfibers into the end cap at an initial pressure of about 20 to about 100 psi for friction contact and heat generation, and regulating the application pressure wherein the pressure applied to the filter element diminishes during the period of contact with the end cap.

23. The method according to claim 16, wherein the end cap is heated to a temperature exceeding its softening point but below the end cap vulcanizate degradation temperature and wherein the temperature is insufficient to melt the microfibers, the method further including the step of vulcanizate penetration into the microfibers.

* * * * *